US012771888B2

(12) United States Patent
Shin

(10) Patent No.: US 12,771,888 B2
(45) Date of Patent: Oct. 20, 2026

(54) DELIVERY OF INTERMEDIATE MEDIA DURING RETRIEVAL OF REQUESTED MEDIA

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 18/883,440

(22) Filed: Sep. 12, 2024

(65) Prior Publication Data

US 2025/0119604 A1 Apr. 10, 2025

Related U.S. Application Data

(60) Provisional application No. 63/587,906, filed on Oct. 4, 2023.

(51) Int. Cl.
*H04N 21/25* (2011.01)
*G06F 16/432* (2019.01)
*G06T 11/00* (2006.01)

(52) U.S. Cl.
CPC ........... *H04N 21/25* (2013.01); *G06F 16/432* (2019.01); *G06T 11/00* (2013.01)

(58) Field of Classification Search
CPC ........ H04N 21/25; G06F 16/432; G06T 11/00
See application file for complete search history.

(56) References Cited

U.S. PATENT DOCUMENTS 11,432,047 B1 * 8/2022 Panchaksharaiah .. H04L 51/046
2018/0160179 A1 * 6/2018 Jeon .................. H04N 21/4722
2019/0289359 A1 * 9/2019 Sekar ................. H04N 21/4333
2020/0241734 A1 7/2020 Soni et al.
2022/0046302 A1 2/2022 Shanson et al.
2022/0374585 A1 11/2022 Wang et al.
2025/0139160 A1 * 5/2025 Miller .................. H04N 21/251
2025/0193464 A1 * 6/2025 Arbel ................. H04N 21/2343

FOREIGN PATENT DOCUMENTS

CN 116233491 6/2023

OTHER PUBLICATIONS

"How to optimize inference of stable diffusion model when the images generated are of different seed but with same prompt?", https://discuss.huggingface.co/t/how-to-optimize-inference-of-stable-diffusion-model-when-the-images-generated-are-of-different-seed-but-with-same-prompt/38024/1, Apr. 28, 2023, 1 page.

* cited by examiner

*Primary Examiner* — Nicholas T Corbo
(74) *Attorney, Agent, or Firm* — Colby Nipper PLLC

(57) ABSTRACT

This document describes systems and techniques for presenting intermediate media to a user that has presented a media request. In aspects, a media request for requested media is received from an input device. The media request is provided to a media service to serve the requested media to a requested device. The media request is processed to identify attributes of the media request indicative of a subject matter of the requested media. Based on the identified attributes of the media request, intermediate media is accessed including one or more images related to the identified attributes. The intermediate media is delivered to the requested device. Accordingly, the intermediate media provides content to engage the user while the user waits for the requested media to be delivered.

36 Claims, 10 Drawing Sheets

DELIVERY OF INTERMEDIATE MEDIA DURING RETRIEVAL OF REQUESTED MEDIA

CROSS-REFERENCE TO RELATED APPLICATION(S)

This application claims priority to U.S. Provisional Patent Application Ser. No. 63/587,906, filed on Oct. 4, 2023, the disclosure of which is incorporated by reference herein in its entirety.

BACKGROUND

Viewing streaming video is a staple of home entertainment. Users employ streaming devices or smart televisions to access video content from countless online services. Users also access video content via portable devices such as wireless telephones, tablet computers, and personal computers. Those users may wish to view that content or share that content with others on a larger screen through the use of a casting device, such as a Google Chromecast® or a similar device. Using such a device, a user is able to send a media request to a media service that communicates with a requested device, such as a television, which includes or is associated with a streaming device to which the media service sends the requested media for presentation on the requested device.

Once the user sends the media request via their wireless telephone or other input device, it may take several seconds before the media service is able to deliver the requested media to the requested device for presentation to the user. During this interval, the user may be presented with a blank screen or a mainly static image that may present some moving indicator that indicates that a video stream is being prepared and/or transmitted. This leaves the user with several seconds in which the user is not engaged, because it takes time to process the media request, retrieve the requested media, and prepare or format the requested media for presentation to the requested device, as well as additional time to actually transmit the requested media to the requested device and cause it to be presented to the user. In an era when so many users are privileged to be able to quickly access content of their choice, it may be unsatisfying for a user to have to wait even a few seconds for interesting media content to be presented.

SUMMARY

This document describes systems and techniques for presenting intermediate media to a user that has presented a media request, where the intermediate media includes one or more images that are presented while media responsive to the media request is being prepared for presentation to the user. From the time that the user presents the media request, it may take several seconds or longer to access the requested media, prepare the requested media for the user, and deliver the requested media to the user. Intermediate media is selected or generated for the user based on content of the media request so that the intermediate media is topically related to the object of the media request. The intermediate media provides content to engage the user while the user waits for the requested media to be delivered.

For example, a media request is received for streaming content from an input device. The media request is presented to a media service to serve the streaming content to a requested device. The media request is processed to identify attributes of the media request indicative of the subject matter of the requested content. Based on identified attributes of the media request, intermediate media is accessed that includes one or more images related to the identified attributes. The intermediate media is delivered to the requested device in an interim period generally before the streaming content is served to the requested device or before the streaming content is rendered. The intermediate media also could be presented over unpaid advertisements or miscellaneous content that may not be of interest as compared to the intermediate media generated in response to the user's interests manifested in the media request.

In an implementation, a method includes receiving a media request for requested media from an input device. The media request is provided to a media service to serve the requested media to a requested device. The media request is processed to identify attributes of the media request indicative of a subject matter of the requested media. Based on the identified attributes of the media request, intermediate media is accessed including one or more images related to the identified attributes. The intermediate media is delivered to the requested device.

In another implementation, a system includes an intermediate media service configured to analyze a media request received from an input device and directed to a media service, the media request being configured to initiate delivery of requested media at a requested device. The intermediate media service being configured to analyze the media request to identify attributes of the media request, the identified attributes being indicative of the subject matter of the requested media. Based on the identified attributes of the media request, the intermediate media service is configured to access intermediate media including one or more images related to the identified attributes. The intermediate media service is configured to deliver the intermediate media to the requested device.

This Summary is provided to introduce systems and techniques for presenting intermediate media to a user that has presented a media request, such as while media responsive to the media request is being prepared for presentation to the user, as further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for presenting intermediate media to a user that has presented a media request while media responsive to the media request is being prepared for presentation to the user are described in this document with reference to the following drawings. The same numbers are used throughout the drawings to reference like features and components.

DETAILED DESCRIPTION

Overview

Figure 1:
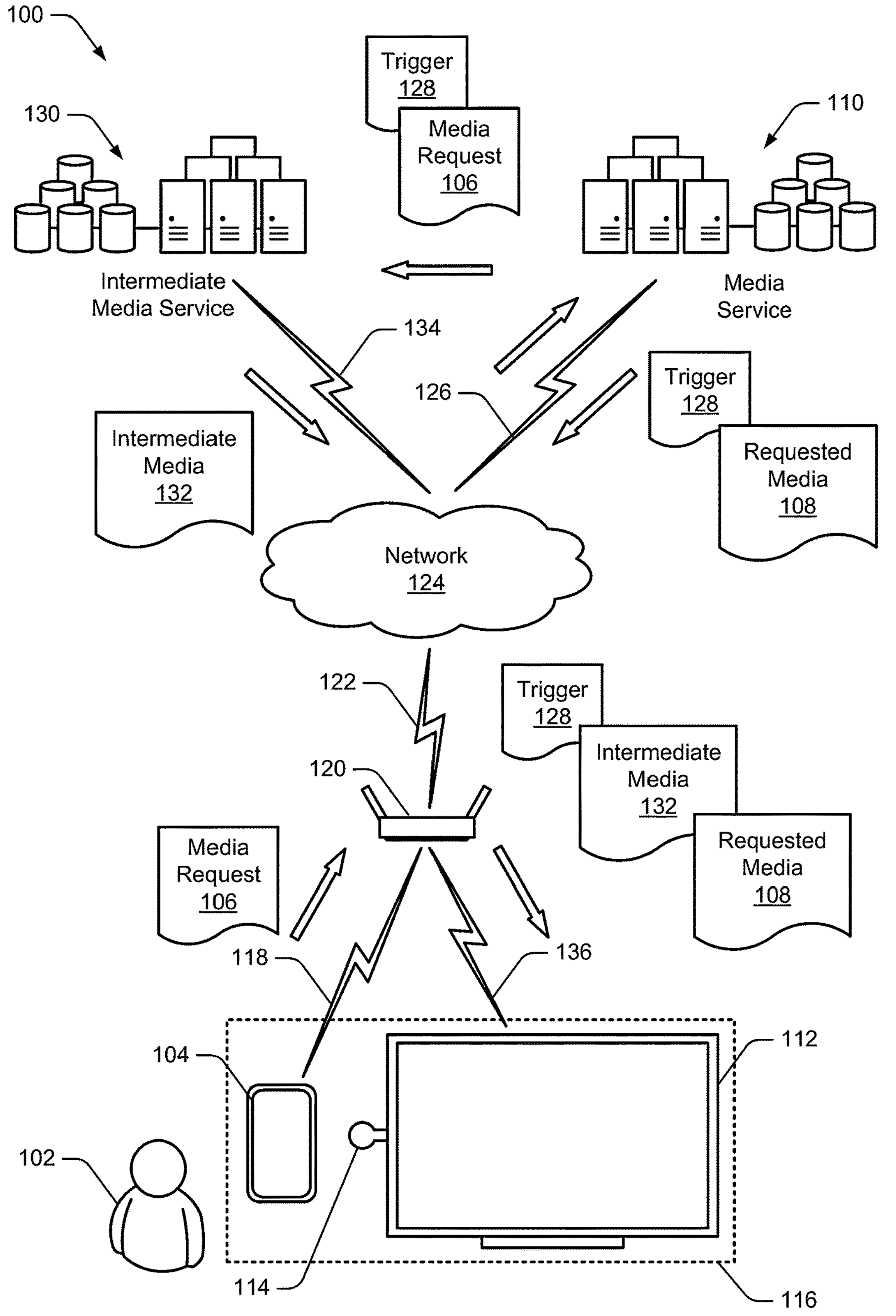
FIG. 1 is a block diagram of a system to present intermediate data and requested media in response to a user request.

Streaming media techniques enable users to request media over a network from media services and to have the media presented in a matter of seconds. One form of requesting streaming media involves a user entering a media request on a computing device, such as a mobile telephone or a computer, to be cast to a streaming device coupled with a television or a television that incorporates an integrated streaming device. Depending on the media request, available bandwidth, network traffic, and hardware capabilities, the requested media may be delivered after an interval ranging from a few seconds to several seconds while the media request is being serviced.

The length of the interval between the media request and initiating presentation of the requested media on the streaming device may depend on many factors. Part of the delay may be a result of network traffic. It is understood that the media is not directly cast from the input computing device to the streaming device. To the contrary, the media is requested from a media service operating on one or more remote servers over a network by the input device. The media service then sends the media back to the streaming device via the network. As a result, casting of the media to the streaming device may be slowed by transmission speeds of a wide-area network and a local-area network, as well as by demands placed on those networks by other devices. In addition, a significant portion of the interval that a user waits for the requested media may be consumed at the media service and/or media storage while the requested media is being retrieved and/or prepared for transmission. For example, the requested media may have to be formatted or otherwise adjusted for the available display resolution of the streaming device or for available network bandwidth between the media service and the streaming device. In addition, handshaking between the media service and the streaming device to establish communications between the media service and the streaming device may take time. Redirecting the streaming device to accept the requested media instead of other media currently being presented may result in an additional delay. During the time required for these processes to occur, the television may be in a waiting state during which the television displays a title of the requested media but is generally idle while the user waits for service of the requested media.

Intermediate media, such as a series of generated still images, may be generated and presented in less time than may be required to present the requested media on the streaming device. Generating and/or retrieving a series of still images may take less time than is required to format or otherwise prepare a stream of requested media for presentation on the streaming device. Also, far less bandwidth and transmission time is required to transmit still images over a network than to transmit the volume of data included in a stream of video data. Thus, for example, a "generative short" comprised of a series of still images may be prepared and transmitted to the streaming device in less time than is required to send the requested media to the streaming device, providing some media to engage the attention of the viewer while the viewer waits for the requested media to be presented.

In implementations, an intermediate media service processes the media request to identify attributes from data and/or metadata that present attributes of the requested media. Using the identified attributes, the intermediate media service prepares intermediate media, either from stored media or produced by generative media, that may include one or more images that relate to the data and/or metadata included in the media request and presents the intermediate media to the user via the streaming device of or coupled with the television. The user thus may be engaged by the intermediate media while waiting for the requested media to be served. In other words, the intermediate media fills at least a portion of the interval during which the user otherwise would be waiting for their requested media and, thus, gives the user something to look at while waiting for their requested media.

This document describes systems and techniques for presenting intermediate media to a user that has presented a media request, where the intermediate media includes one or more images that are presented while media responsive to the media request is being prepared for presentation to the user. From the time that the user presents the media request, it may take several seconds or longer to access the requested media, prepare the requested media for the user, and deliver the requested media to the user. Intermediate media is selected or generated for the user based on content of the media request so that the intermediate media is topically related to the object of the media request. The intermediate media provides content to engage the user while the user waits for the requested media to be delivered.

For example, a media request is received for streaming content from an input device. The media request is presented to a media service to serve the streaming content to a requested device. The media request is processed to identify attributes of the media request indicative of a subject matter of the requested content. Based on the identified attributes of the media request, intermediate media is accessed that includes one or more images related to the identified attributes. The intermediate media is delivered to the requested device in an interim period before the streaming content is served to the requested device.

Example System for Presenting Intermediate Media

FIG. 1 illustrates a system 100 in which a user 102 uses an input device 104, such as a mobile telephone (as shown in FIG. 1) or a computer, to generate a media request 106. The media request 106 allows the user 102 to access requested media 108 from a media service 110 for presentation on a requested device 112, such as a television (as shown in FIG. 1). The requested device 112 may be equipped with a streaming device 114, such as a Google Chromecast® that is configured to receive the requested media 108 from the media service 110 and to present the requested media 108 on the requested device 112. In such an environment, the input device 104 may be regarded as a "pairing device" in that the input device 104 is paired with the streaming device 114 to generate the media request 106 for presentation via the requested device 112 with which the streaming device 114 is connected.

In other environments, the input device 104, the requested device 112, and the streaming device 114 may be an integrated device 116 (shown in dotted lines in FIG. 1) in which the integrated device 116 receives the media request 106 from the input device 104 via a remote control or other interface of the integrated device 116, transmits the media request 106, and receives the requested media 108 from the media service 110 for presentation to the user 102 via the integrated device 116. A smart television is an example of such an integrated device 116. The system 100 operates in a similar fashion with a separate input device 104, requested device 112, and streaming device 114 as it does with the integrated device 116. Accordingly, operation of the system 100 is described with reference to the separate input device 104, requested device 112, and streaming device 114, although it should be understood the foregoing description operates similarly with an integrated device 116.

The media request 106 generated by the input device 104 is transmitted via a communications link 118, such as an IEEE 802.01-type Wi-Fi connection, to a network access point 120, such as a wireless router or access point. The network access point 120 transmits the media request 106 via a wireless or wired communications link 122 to a network 124, such as the Internet. The media request 106 is communicated from the network 124 via another communications link 126 to the media service 110. The media service 110 processes the media request 106 to initiate the process of serving the requested media 108. As part of this processing, the media service 110 generates a trigger 128 that contains some information about the requested media 108 and that is sent to the streaming device 114 to ready the requested device 112 to receive the requested media 108.

The media service 110 communicates the media request 106 and the trigger 128 to an intermediate media service 130 that processes data and/or metadata included in the media request 106 and/or the trigger 128 to identify attributes about the media request 106. The intermediate media service 130 may use the identified attributes to retrieve and/or generate intermediate media 132 that is relevant to the media request 106 and, thus, of possible interest to the user 102. The media service 110 and the intermediate media service 130 may be incorporated within a single system or may constitute separate systems that communicate via a communications link (not shown in FIG. 1).

As described further below, the intermediate media 132 includes one or more images that relate to the identified attributes. As also described further below, the one or more images may be presented in a sequential, random, or continuous loop via the streaming device 114 to the requested device 112 to engage the user 102 while the media service 110 retrieves the requested media 108. The intermediate media 132 is transmitted via a communications link 134 to the network 124, from which the intermediate media 132 is then transmitted via the communications link 122, the network access point 120, and a communications link 136 to the streaming device 114. The intermediate media 132 is then presented to the user 102 via the requested device 112. Responsive to the media service 110 completing a process of retrieving and/or preparing the requested media 108, the media service 110 transmits the requested media 108 via the communications link 126 to the network 124 and via the communications link 122, the network access point 120, and the communications link 136 to the streaming device 114. At this time, the requested media 108 is presented to the user 102 via the requested device 112. In implementations, once the requested media 108 is presented at the streaming device 114 and the requested device 112, the requested media 108 is presented to the user 102, superseding presentation of the intermediate media 132. It will be appreciated that, in delivering the requested media 108 or the intermediate media 132 to the requested device 112, the requested media 108 and the intermediate media 132 may engage the streaming device 114, whether or not it is specifically mentioned.

Figure 2:
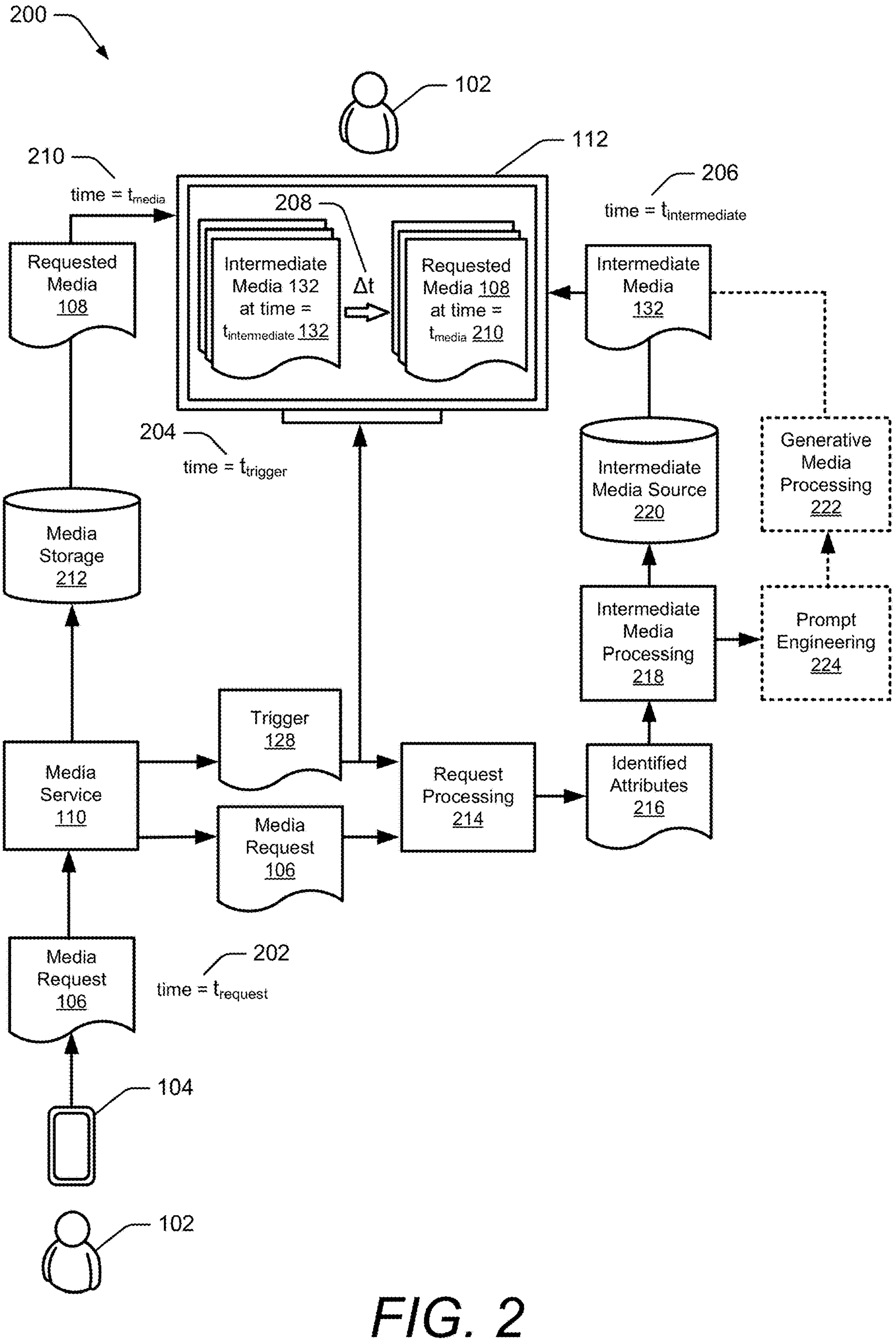
FIG. 2 is a block diagram of a process of presenting intermediate data and requested media in response to a user request.

FIG. 2 illustrates a process 200 by which the intermediate media service 130 operates to retrieve and/or generate the intermediate media 132. By way of overview, the process begins at time $t_{request}$ 202 with the user 102 generating the media request 106 from the input device 104. At time $t_{trigger}$ 204, the trigger 128 is presented at the requested device 112 and to request processing 214. The intermediate media 132 is presented at the requested device 112 starting at time $t_{intermediate}$ 206, where the intermediate media 132 is presented during an interval Δt 208 until the requested media 108 is delivered at the requested device 112 at time $t_{media}$ 210. The process depicts the operations that are performed between the time $t_{request}$ 202 when the media request 106 is presented and the time $t_{media}$ 210 when the requested media 108 is presented.

The media request 106 is presented to the media service 110 at time $t_{request}$ 202. Following receipt of the media request 106 at time $t_{request}$ 202, the media service 110 initiates retrieval of the requested media 108 from media storage 212. The media service 110 also generates the trigger 128 and sends it to the requested device 112 at time $t_{trigger}$ 204. The media service 110 presents the media request 106 and the trigger 128 to request processing 214. As further described below with reference to FIGS. 3A-4D, request processing 214 parses the data and the metadata of the media request 106 and/or the trigger 128 to identify attributes 216 indicative of a subject matter of the requested media.

The identified attributes 216 may include terms identified in the media request 106, identifying information included in metadata accompanying the media request 106, or other identifiable information from the media request 106. For example, if the media request 106 includes the name of a city or other location, that location may be selected as one of the identified attributes 216. Similarly, terms that identify a type of subject matter, such as a type of sport, an entertainment topic such as movies or music, or type of animal, plant, or other nature phenomenon, may be selected as one of the identified attributes 216. The name of a celebrity or another well-known individual may be flagged as an identified attributes 216. Any words included in the media request 106 may be regarded as one of the identified attributes 216. The identified attributes 216 are then presented for intermediate media processing 218, which uses the identified attributes 216 to select subject matter relevant to the media request 106 in retrieving and/or generating the intermediate media 132.

In implementations, the intermediate media processing 218 uses the identified attributes 216 to retrieve pre-existing actual or previously created images. The intermediate media processing 218 formulates a query using terms or other information in the identified attributes 216 to retrieve one or more images from an intermediate media source 220, which are then sent to the requested device 112 as the intermediate media 132 at time $t_{intermediate}$ 206. In other implementations, instead of retrieving pre-existing actual or previously created images from the intermediate media source 220, the intermediate media processing 218 presents a query based on the identified attributes 216 to generative media processing 222, which generates one or more images based on the query. The generative media processing 222 may engage prompt engineering 224 to form or refine the query to facilitate the generative media processing 222 being able to generate the one or more images. The one or more images generated by the generative media processing 222 are then sent to the requested device 112 as the intermediate media 132 at time $t_{intermediate}$ 206.

The one or more images included in the intermediate media 132 and delivered at time $t_{intermediate}$ 206 are presented during the interval Δt 208 before the requested media 108 is presented at $t_{media}$ 210. Here, the requested media 108 supersedes presentation of the intermediate media 132 at the requested device 112.

Example Techniques for Presenting Intermediate Media

Figure 3A:
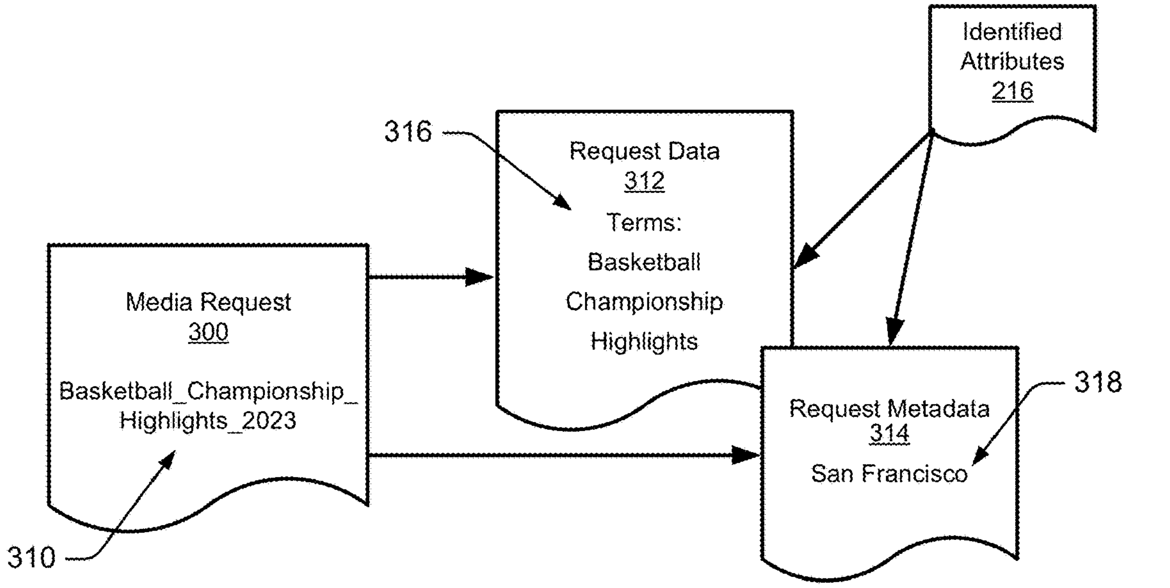
FIGS. 3A and 3B are block diagrams of a process of presenting intermediate data retrieved from media storage.
Figure 3B:
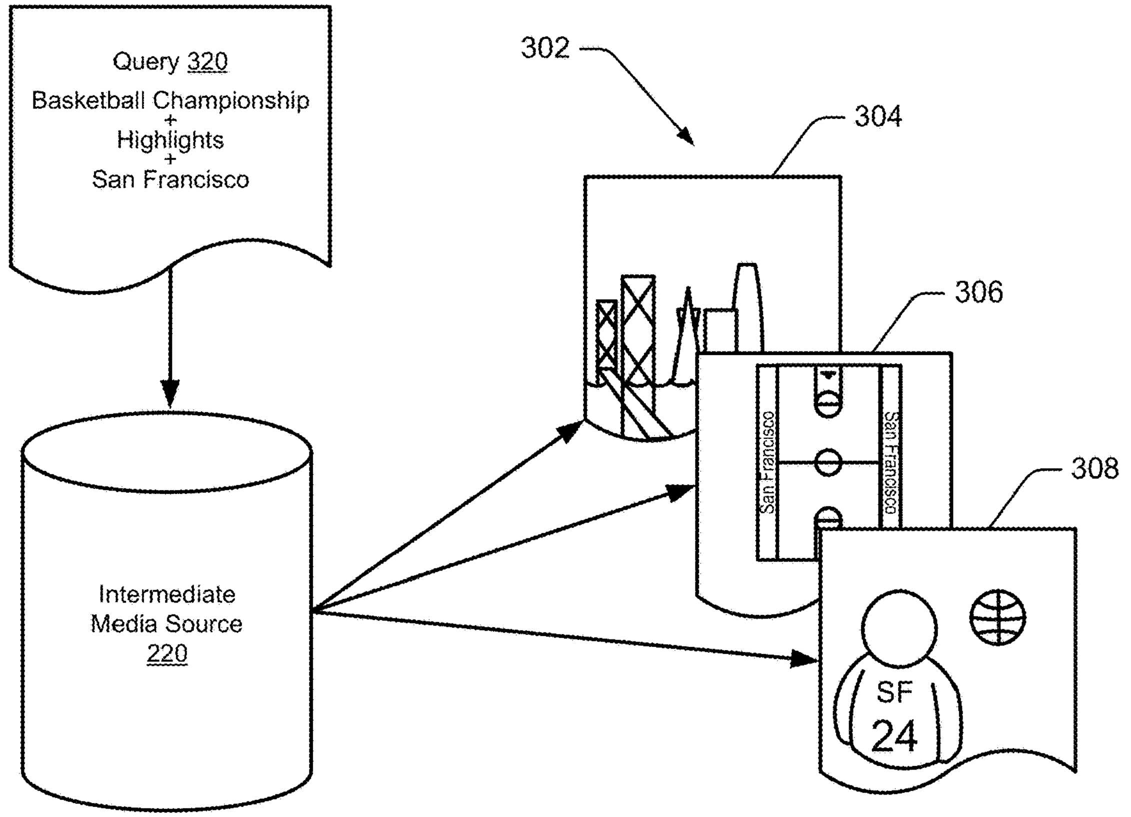

FIGS. 3A and 3B show an example of a media request 300 used to retrieve intermediate media 302 including images 304, 306, and 308 from the intermediate media source 220 (see FIG. 2). The media request 300 includes a user request 310 to access "Basketball Championship_Highlights_2023." The request processing 214 parses the media request 300 and selects identified attributes 216 from request data 312 and request metadata 314 included in the media request 300. The identified attributes 216 from the request data 312 include terms 316 such as "basketball," "championship," and "highlights." The request processing 214 also parses the request metadata 314, which includes, for example, a location from which the media request 300 was received, "San Francisco" 318.

Using the identified attributes 216, the intermediate media processing 218 prepares a query 320 for the intermediate media source 220 from the identified attributes 216. The query 320 may be, for example, "Basketball Championship+Highlights+San Francisco." In response to the query 320, the intermediate media source 220 generates intermediate images of San Francisco 304, 306, and 308, including an image of the skyline of San Francisco, an interior of the basketball arena in San Francisco, and an image of a San Francisco player, respectively. The intermediate images 304, 306, and 308 are presented to the user 102 while awaiting service of the requested media 108. The intermediate images 304, 306, and 308 include pre-existing images, either captured or created and retrievable from the intermediate media source 220.

Figure 4A:
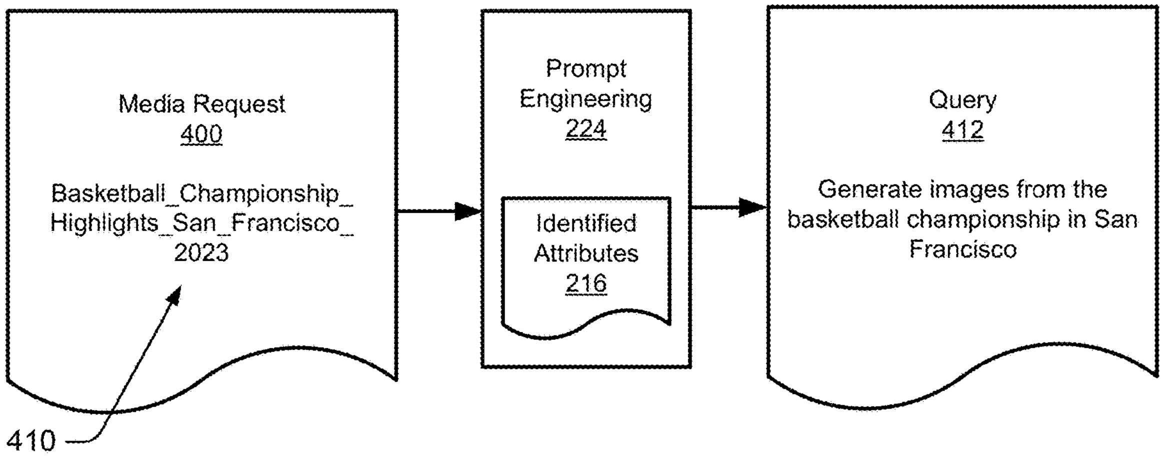
FIGS. 4A and 4B are block diagrams of a process of presenting intermediate data using generative media.
Figure 4B:
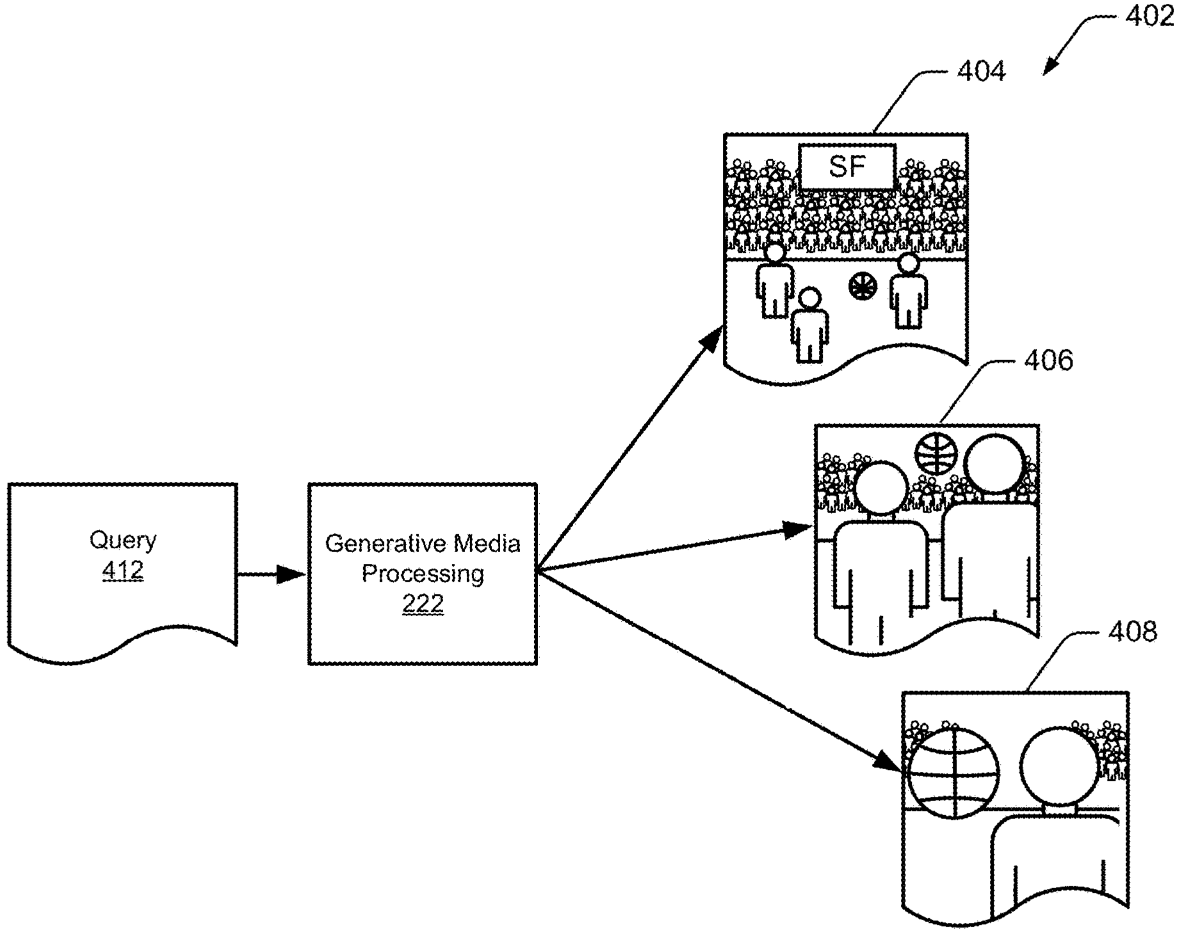

Instead of retrieving the intermediate images 304, 306, and 308 or other pre-existing images, from the intermediate media source 220, as described with reference to FIG. 2, the intermediate media processing 218 may use generative media processing 222 to provide the intermediate media 132. Referring to FIGS. 4A and 4B, a media request 400 results in generated intermediate media 402 including generated images 404, 406, and 408. The media request 400 includes a 410 to user request access "Basketball_Championship_Highlights_San_Francisco_2023." The request processing 214 (see FIG. 2) parses the media request 400 and selects identified attributes 216 and presents the identified attributes 216 to the prompt engineering 224. The prompt engineering 224 generates a query 412.

The query 412 is then presented to the generative media processing 222. The generative media processing 222 may, for example, identify seeds from the query 412 and use content-guided generative inferences to generate images from a large diffusion model. The diffusion model may run in parallel with different seeds so as to generate different sets of intermediate images 404, 406, and 408. As a result, the generative media processing 222 generates, for example, the intermediate images 404, 406, and 408 of a basketball game being played in San Francisco. The intermediate images 404, 406, and 408 are delivered to the user 102 while awaiting service of the requested media 108.

Figure 5:
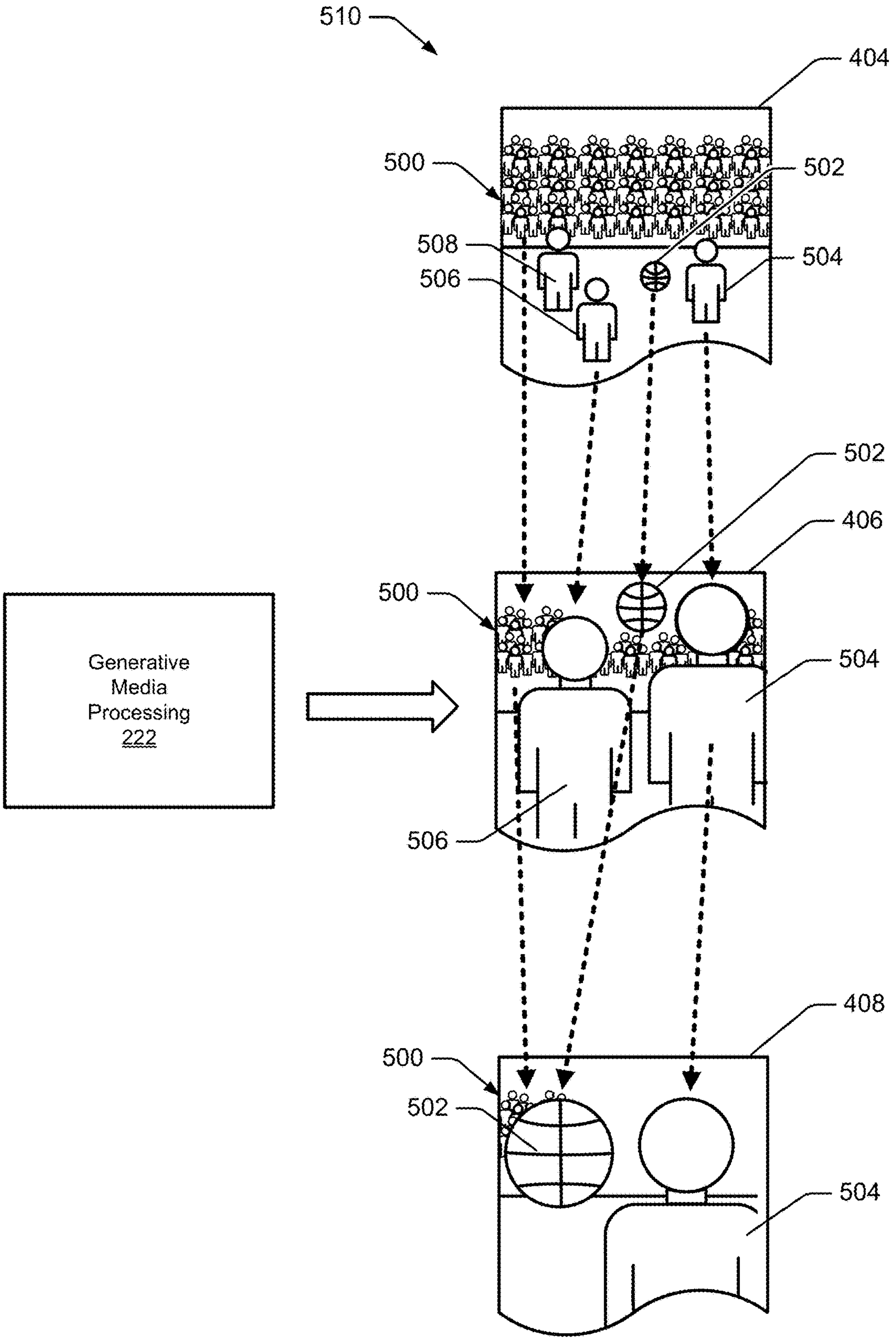
FIG. 5 is a schematic diagram showing linking of elements within the generative media of FIGS. 4A and 4B to present a seamless generative short.

As part of the generative media processing 222, elements within the intermediate images 404, 406, and 408 may be linked to facilitate creating transitions between the images 404, 406, and 408. Referring to FIG. 5, within the first generated intermediate images 404, elements identified include intermediate images 500, 502, 504, 506, and 508 including a crowd element, a ball element, a first player element, a second player element, and a third player element, respectively. The elements 500, 502, 504, 506, and 508 are linked to corresponding appearances of the elements 500, 502, 504, and 506 in the second generated image 406 (the third player element 508 does not appear in the second generated image 406). The elements 500, 502, and 504 are linked to corresponding appearances of the elements 500, 502, and 504 in the third generated image 408 (the second player element 506 does not appear in the third generated image 408). Linking the corresponding elements facilitates transitions between common elements between intermediate images to enable creation of a generative short 510 as the intermediate media 132 delivered to the user 102 (see FIGS. 1 and 2).

Figure 6A:
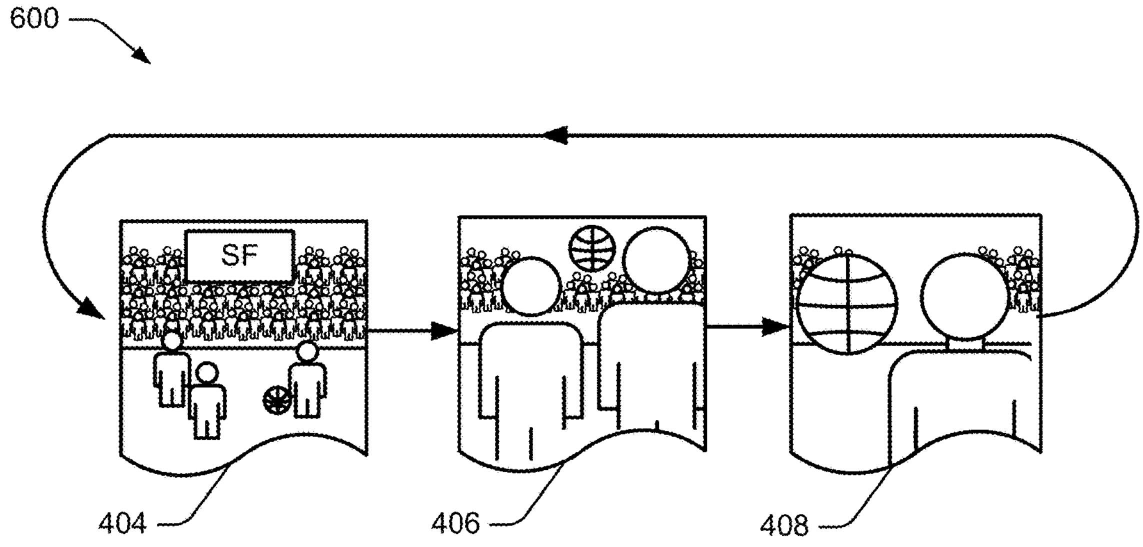
FIGS. 6A and 6B are schematic diagrams of different presentations of intermediate media.

In addition to presenting the generative short 510 as described with reference to FIG. 5, referring to FIGS. 6A and 6B, the intermediate images 404, 406, and 408 (or the intermediate images 304, 306, and 308) may be delivered by the intermediate media service 130 (see FIG. 1) in a repeating loop or in a randomized sequence. FIG. 6A shows a loop 600 of the intermediate images 404, 406, and 408 delivered by the intermediate media service 130 that may be repeatedly presented at the requested device 112 until the requested media 108 (FIGS. 1 and 2) is served. The intermediate images 404, 406, and 408, for example, may be delivered in a loop in which the intermediate image 404 is presented, followed by the intermediate image 406, and then the intermediate image 408, followed by another presentation of the intermediate image 404 as the loop 600 repeats. A duration for which each of the intermediate images 404, 406, and 408 is presented may be determined based on a portion of an estimated time for the requested media 108 to be presented, or the duration may be determined by a user selection or some other parameter.

Figure 6B:
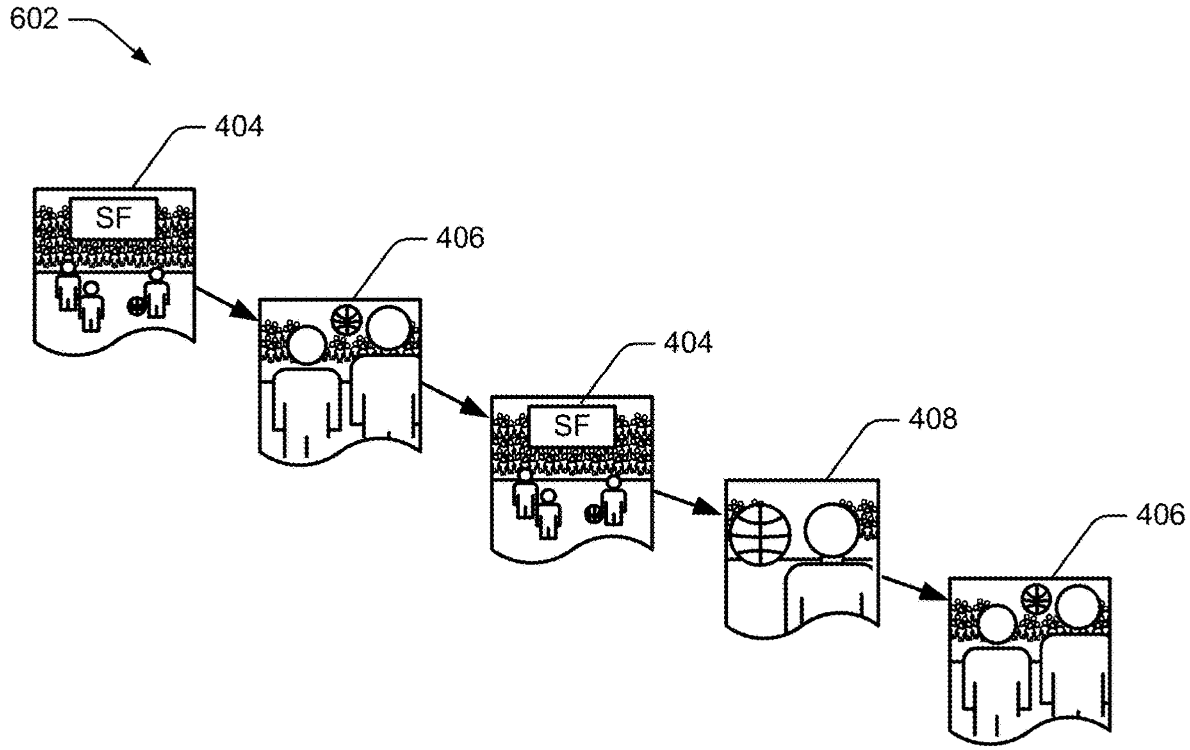
Figure 7A:
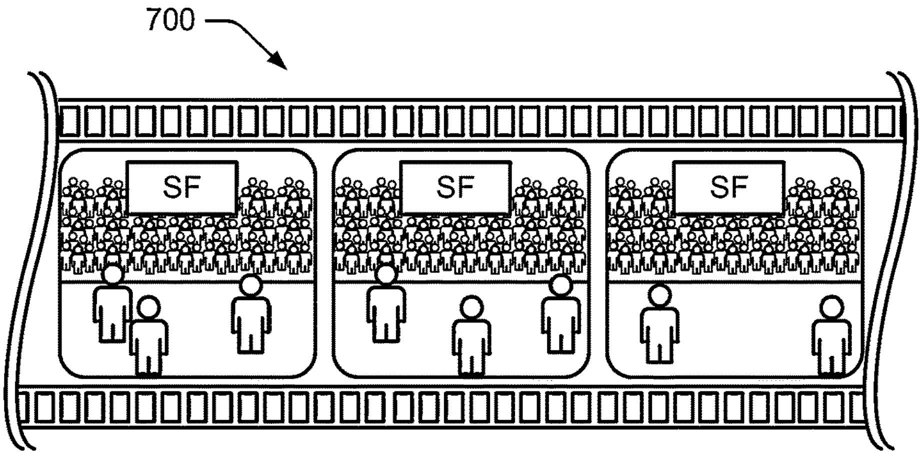
FIGS. 7A-7C are schematic diagrams of different types of intermediate media.
Figure 7B:
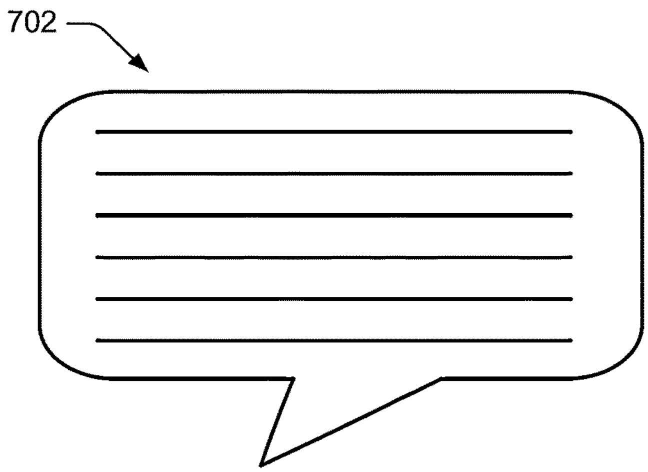
Figure 7C:
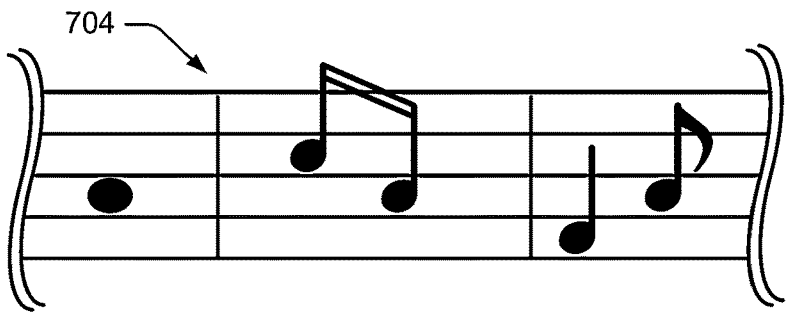

FIG. 6B shows a randomized sequence 602 of the intermediate images 404, 406, and 408 that may be delivered by the intermediate media service 130. The sequence 602 may begin with the first intermediate image 404 and then the second intermediate image 406, but then the first intermediate image 404 may be repeated, followed by the third intermediate image 408, and then the second intermediate image 406. The randomized sequence 602 may continue until the requested media 108 is served.

Although the examples described herein include groups of three intermediate images, including the retrieved intermediate images 304, 306, and 308 and the generated intermediate images 404, 406, and 408, it should be appreciated that groups of three intermediate images are used only for the sake of illustration; there is neither a requirement that three intermediate images be retrieved or generated nor a requirement that a maximum of three intermediate images be used.

Moreover, while the preceding examples describe the presentation of intermediate media in the form of a generative short comprised of a series of images, the intermediate media may include other forms of media. Referring to FIG.

7A, the intermediate media may include a retrievable or generated video clip 700. The video clip 700 may be accessed or generated according to user input, just as the intermediate images used as intermediate media are retrieved or generated, as previously described with reference to FIGS. 3A-5. However, unlike the requested media, the video clip 700 may be generated and/or maintained in a format (e.g., at a relatively low resolution) so that the video clip 700 may be quickly delivered to the requested device 112 without some of the significant preparation or transmission overhead that may result in a delay in delivering the requested media. For example, to allow for quick transmission, the video clip 700 may be encoded or compressed or the video clip 700 may be generated with a reduced framerate, reduced resolution, or with a reduced color range to reduce the size of the video clip 700.

Alternatively or additionally, the intermediate media may include audio data 702 that may be accessed or generated in response to user input. It is understood that the audio data 702, which may include spoken words or other sounds, does not require the bandwidth of video data and that presenting the audio data 702 does not require the kind of formatting or handshaking that may be required to present video data. As a result, the audio data 702 may be delivered more quickly than the requested media 108 and, thus, may be presented to engage a viewer while the viewer awaits delivery of the requested media 108. Finally, the intermediate media 132 may include music 704 that may be retrieved based on the user data. Like the audio data 702, delivering the music 704 does not require the type of preparation, bandwidth requirements, or handshaking that is involved in delivering the requested media 108. The video clip 700, the audio data 702, and/or the music 704 may be combined and delivered as the intermediate media 132 to engage the viewer while awaiting delivery of the requested media 108.

Figure 8:
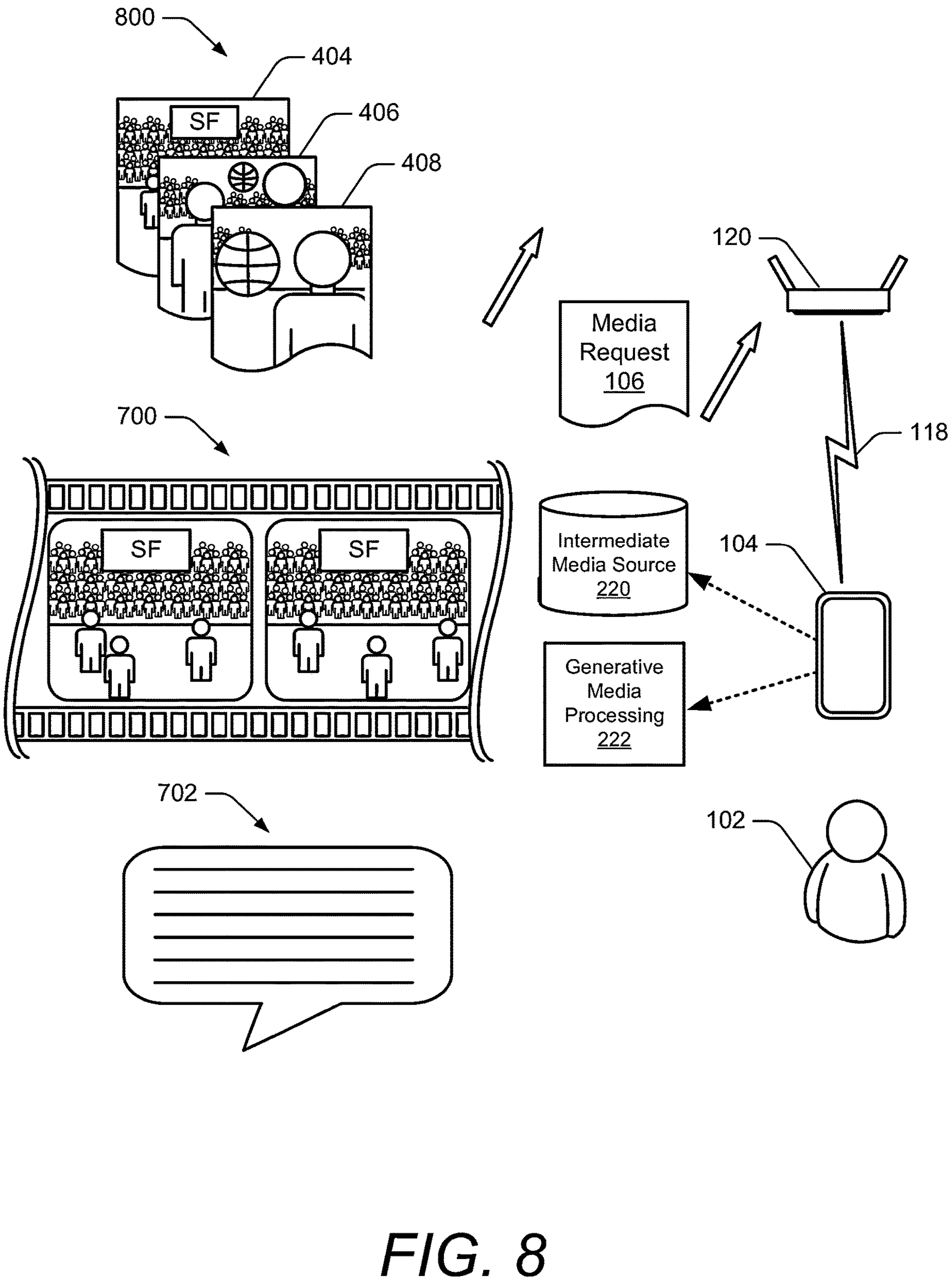
FIG. 8 is a schematic diagram of a system in which intermediate media is generated by an input device.

As previously described, the intermediate media 132 may be sourced from a media service 110 that is remote from the input device 104 and the requested device 112 (see FIG. 1). However, in other implementations, the intermediate media 132 may be generated at the input device 104 and/or at another device locally accessible to the input device 104. Referring to FIG. 8, in a system 800, the intermediate media source 220 or the generative media processing 222 may reside on the input device 104 or may be locally accessible to the input device 104 on a local-area network (not shown). Using input the user 102 presents to access requested media 108, the intermediate media source 220 or the generative media processing 222 produce the intermediate media 132 at the input device 104 instead of from a remote intermediate media service (as described with reference to FIGS. 1 and 2).

Thus, for example, the intermediate media 132, such as the intermediate images 404, 406, and 408, may be retrieved and/or generated at the input device 104. Along with the media request 106, the intermediate media 132 produced at the input device 104 is sent via the network access point 120 over the network 124 (not shown in FIG. 8) from which it may be delivered for presentation via the requested device 112 (also not shown in FIG. 8). The intermediate images 404, 406, and 408, when retrieved from the intermediate media source 220, may include user photographs that have been tagged or associated with metadata that is relevant to the request 106 presented by the user 102 for the requested media 108 or may be randomly selected to provide media to engage the user 102 while the user 102 awaits delivery of the requested media 108. In addition to the intermediate media 132 consisting of the intermediate images 404, 406, and 408, the intermediate media 132 may include video and/or audio that is generated by and/or retrieved from the input device 104, such as the video clip 700 and/or the audio data 702. The input device 104, being in direct receipt of the request 106 entered by the user 102, may quickly respond to the request 106 to generate and/or retrieve the video clip 700 and/or the audio data 702 that may be transmitted to the requested device 112 for presentation while the user 102 awaits delivery of the requested media 108. In aspects, the intermediate media 132 generated at the input device 104 may be transmitted directly to the requested device 112 and/or locally transmitted to the requested device 112 via the network access point 120 to provide for rapid delivery of the intermediate media 132.

Figure 9:
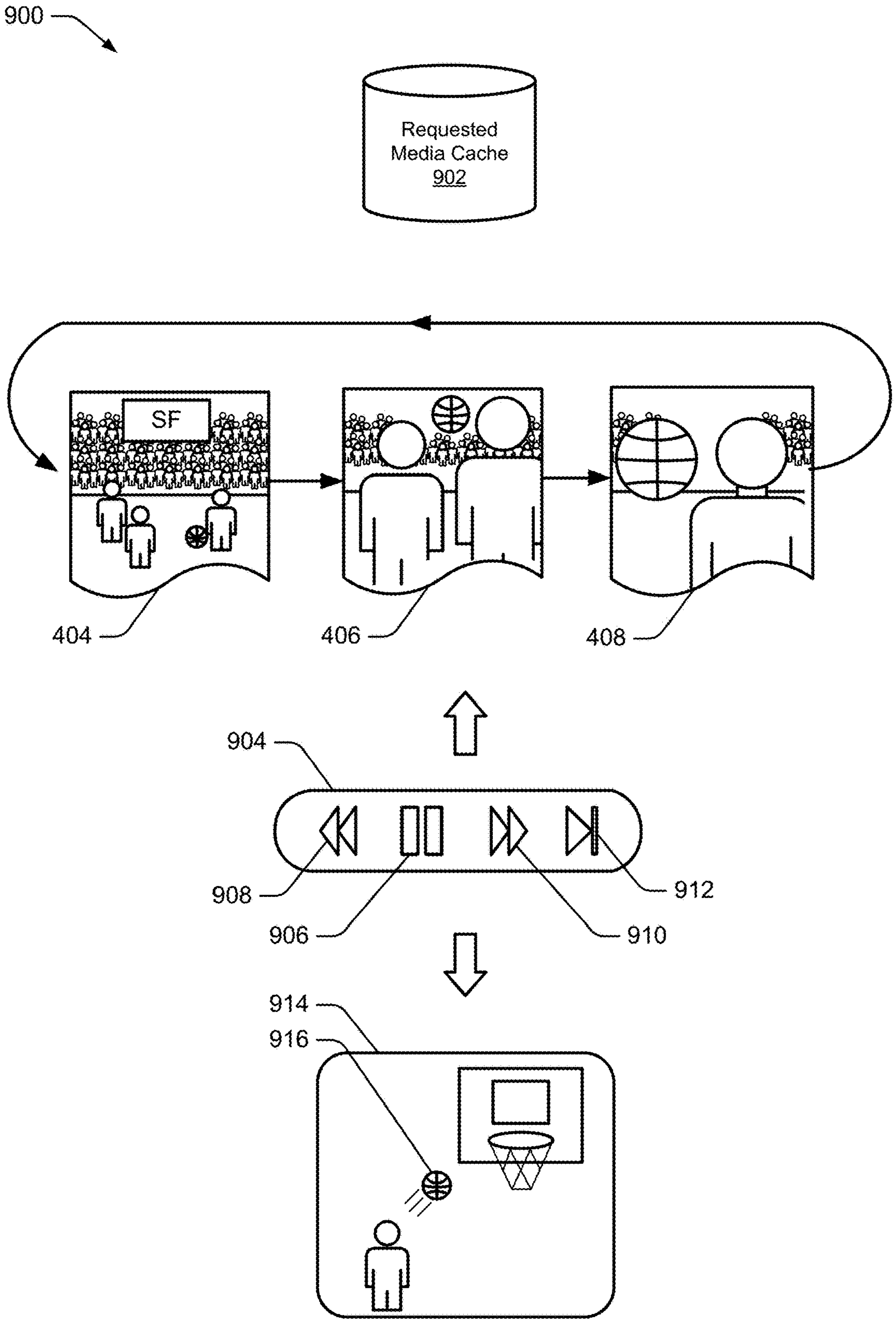
FIG. 9 is a schematic diagram of a system that enables a user to selectively engage intermediate media.

Referring to FIG. 9, in other implementations, the user 102 may be provided with options to control presentation of the intermediate media 132 and/or the requested media 108. As previously described, the intermediate media 132 generally is provided as a way to engage the attention of the user 102 until the requested media 108 is available, at which time the requested media 108 is presented at the requested device 112. However, if the user 102 becomes intrigued with the intermediate media 132, the user 102 may wish to continue to engage the intermediate media 132 even after the requested media 108 becomes available. In a system 900, a requested media cache 902 may be included at the requested device 112 or at the media service 110 (not shown in FIG. 9) so that the requested media 108 may be temporarily stored while the user 102 engages with the intermediate media 132. Controls 904 may be provided to the user 102 at the input device 104 or on the requested device 112 (and accessible to the user 102 by the input device 104 or another control device) to allow the user 102 to manipulate the intermediate media 132, such as the intermediate images 404, 406, and 408. Similarly, the controls 904 may enable the user 102 to control flow of other intermediate media 132 presented, such as the video clip 700, the audio data 702, or the music 704 (not shown in FIG. 9).

For example, the controls 904 may include a pause/play toggle 906 to permit the user 102 to pause and/or resume play of the intermediate media 132. The controls 904 also may include rewind 908 and fast forward 910 controls to permit the user 102 to rewind or advance the intermediate media 132, respectively. Thus, the user 102 can engage or reengage portions of the intermediate media 132 of particular interest. In implementations, once the user 102 begins to engage the intermediate media 132, the requested media 108 is held until the user 102 is done engaging with the intermediate media 132. The user 102 then may use an advance input 912 to skip from the intermediate media 132 to the requested media 108. User settings (not shown) may allow the user 102 to specify that the requested media 108 is not to be presented until the user 102 requests to advance from the intermediate media 132.

In aspects, the intermediate media 132 may include a game 914, such as a casual game, retrievable or generated for the amusement of the user 102 while waiting for the requested media 108. The game 914 may be related to content of the requested media 108 and, thus, in the continuing example, may include a basketball shooting game for the user 102 to play while awaiting the requested media 108 about basketball. For example, the user 102 may manipulate the rewind control 908 to direct action of the game 914 to one side and manipulate the fast forward control 910 to direct action of the game 914 to the other side, while using the pause/play button 906 to initiate action, such as shooting a ball 916. When the user 102 is done with the game 914, the user 102 may engage the advance input 912 to leave the game 914 to engage with the requested media 108.

Example Method of Presenting Intermediate Media

Figure 10:
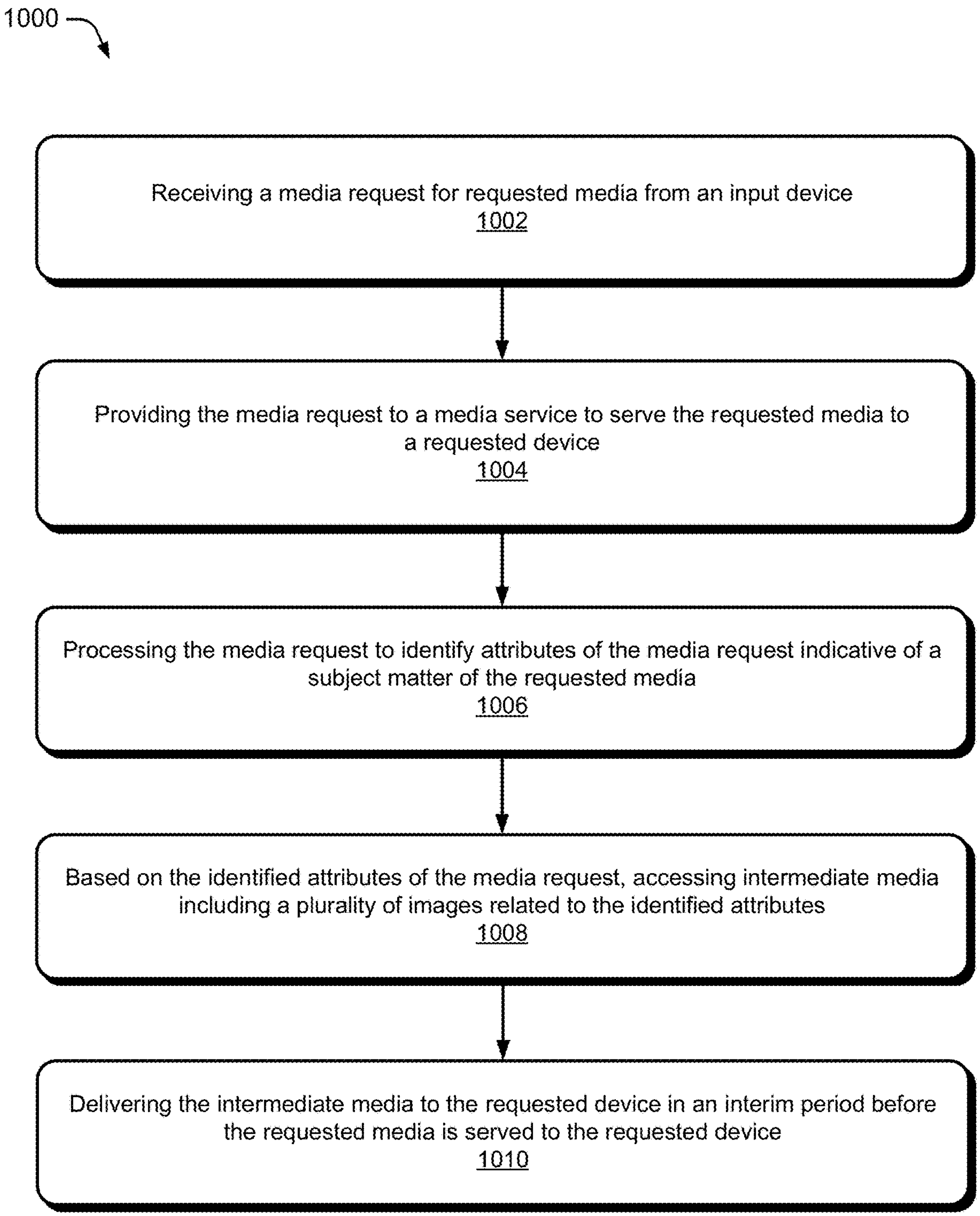
FIG. 10 is a flow diagram of an example method of presenting intermediate media.

FIG. 10 illustrates an example method 1000 of presenting intermediate media 132 to the user 102 while the user 102 awaits service of the requested media 108, as previously described with reference to FIGS. 1 and 2. The method 1000 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environments 100 or 200 of FIGS. 1 and 2, respectively, or to entities or processes as detailed in other figures, reference to which is made for example only. The techniques are not limited to performance by one entity or multiple entities operating on one device.

In the method 1000, at a block 1002, a media request 106 is received for requested media 108 from an input device 104, as also previously described with reference to FIGS. 1 and 2. At a block 1004, the media request 106 is presented to a media service 110 to serve the requested media 108, as also described with reference to FIGS. 1 and 2. At a block 1006, the media request 106 is processed to identify attributes 216 of the media request 106 indicative of subject matter of the requested media 108, as described with reference to FIGS. 2, 3A and 3B, and 4A and 4B. At a block 1008, based on the identified attributes 216 of the media request 106, intermediate media 132 is accessed including one or more images related to the identified attributes 216, as described with reference to FIGS. 3A and 3B and FIGS. 4A and 4B. At a block 1010, the intermediate media 132 is delivered to a requested device 112 during an interval Δt 210 before the requested media 108 is served to the requested device 112, as described with reference to FIG. 2.

For example, as previously described with reference to FIGS. 4A and 4B, using implementations of the method of FIG. 10, at the block 1002, the media request 400 for requested media 108, such as basketball championship highlights for San Francisco 2023, may be received from the input device 104. At the block 1004, the media request 400 may be presented to a remote media service or a local media service, as described with reference to FIGS. 1 and 9, respectively. At the block 1006, the media request 400 may be processed, such as by using prompt engineering 224 or other processes, to yield the query 412 for generative media based on attributes 216 included in the media request 400, such as "basketball championship," "highlights," "San Francisco," and "2023." At the block 1008, based on the identified attributes 216 of the media request 400, the one or more intermediate images 404, 406, and 408 related to the identified attributes 216 are generated, retrieved, or otherwise produced to yield the intermediate media 402 for the user 102. At the block 1010, the intermediate media 402 is delivered to the user 102 via the requested device 112 while the user 102 awaits delivery of the requested media 108.

This document describes systems and techniques for presenting intermediate media to a user that has presented a media request while media responsive to the media request is being prepared for presentation to the user. From the time that the user presents the media request, it may take several seconds or longer to access the requested media, prepare the requested media for the user, and deliver the requested media to the user. Intermediate media is selected or generated for the user based on content of the media request so that the intermediate media is topically related to the object of the media request. The intermediate media provides content to engage the user while the user waits for the requested media to be delivered. These systems and techniques may be realized using one or more of the entities or components shown in FIG. 1 and used as described with reference to FIGS. 2, 3A and 3B, 4A and 4B, 5, 6A, 6B, 7A, 7B, and 7C. Thus, these figures illustrate some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Conclusion

Although implementations of systems and techniques for presenting intermediate media to a user that has presented a media request while media responsive to the media request is being prepared for presentation to the user have been described in language specific to certain features and/or methods, the subject of the appended claims is not necessarily limited to the specific features or methods described. Rather, the specific features and methods are disclosed as example implementations of systems and techniques for presenting intermediate media to a user that has presented a media request, such as during an interval during which media responsive to the media request is being prepared for presentation to the user.

What is claimed is:

1. A method comprising:
receiving a media request for requested media, the media request received from an input device;
providing the media request to a media service to serve the requested media to a requested device;
processing the media request to identify attributes of the media request indicative of a subject matter of the requested media, the processing the media request including parsing:
the media request received from the input device; and
a trigger derived from the media request, the trigger intended for directing the media request to the requested device to prepare the requested device for presenting content responsive to the media request;
based on the identified attributes of the media request, accessing intermediate media including one or more images related to the identified attributes; and
delivering the intermediate media to the requested device.

2. The method of claim 1, further comprising delivering the intermediate media to the requested device in an interim period before the requested media is served to the requested device.

3. The method of claim 1, wherein parsing the media request to identify the attributes of the media request includes parsing metadata included in the media request or the trigger derived from the media request.

4. The method of claim 1, wherein accessing the intermediate media related to the identified attributes includes retrieving pre-existing images from an image repository, the pre-existing images corresponding to one or more of the identified attributes.

5. The method of claim 4, wherein the image repository includes captured images of one or more people, objects, or locations.

6. The method of claim 1, wherein accessing the intermediate media related to the identified attributes includes formulating a query based on the identified attributes of the media request to be presented to a generative media processing system to produce one or more generated images.

7. The method of claim 6, wherein formulating the query includes at least one of:

joining together one or more of the identified attributes into a terms-based query; or applying language processing to the one or more identified attributes to formulate a textual query.

8. The method of claim 6, further comprising providing one or more initial images of the one or more generated images during an interval, the interval including a time during which one or more additional images of the one or more generated images are being produced.

9. The method of claim 1, further comprising delivering the one or more images included in the intermediate media in a repeatable loop of the one or more images or in a random sequence of the one or more images.

10. The method of claim 1, further comprising identifying corresponding elements in two or more of the images and animating a transition between the corresponding elements.

11. A system comprising at least one computing device hosting:

an intermediate media service configured to analyze a media request received from an input device and directed to a media service, the media request being configured to initiate delivery of requested media at a requested device, the intermediate media service being configured to:

analyze the media request to identify attributes of the media request by parsing:

the media request received from the input device; and a trigger derived from the media request, the trigger intended for directing the media request to the requested device to prepare for presenting content responsive to the media request, the identified attributes being indicative of the subject matter of the requested media;

based on the identified attributes of the media request, access intermediate media including one or more images related to the identified attributes; and deliver the intermediate media to the requested device.

12. The system of claim 11, wherein the intermediate media service is configured to access the intermediate media related to the identified attributes by retrieving pre-existing images from an image repository, the pre-existing images corresponding to one or more of the identified attributes.

13. The system of claim 12, wherein the image repository includes captured images of one or more people, objects, or locations.

14. The system of claim 11, wherein the intermediate media service is configured to formulate a query based on the identified attributes of the media request to be presented to a generative media processing system to produce one or more generated images.

15. The system of claim 14, wherein the intermediate media service is configured to formulate the query based on the identified attributes by one of:

joining together one or more of the identified attributes into a terms-based query; or applying language processing to the one or more identified attributes to formulate a textual query.

16. The system of claim 14, wherein the intermediate media service is configured to provide one or more initial images of the one or more generated images during an interval, the interval including a time during which one or more additional images of the one or more generated images are being produced.

17. The system of claim 11, further comprising delivering the one or more images included in the intermediate media in a repeatable loop of the one or more images or in a random sequence of the one or more images.

18. The system of claim 11, wherein the intermediate media service is configured to identify corresponding elements in two or more of the images and to animate a transition between the corresponding elements.

19. A method comprising:

receiving a media request for requested media, the media request received from an input device;

providing the media request to a media service to serve the requested media to a requested device;

processing the media request to identify attributes of the media request indicative of a subject matter of the requested media;

based on the identified attributes of the media request, accessing intermediate media including one or more images related to the identified attributes;

identifying corresponding elements in two or more of the images and animating a transition between the corresponding elements; and delivering the intermediate media to the requested device.

20. The method of claim 19, further comprising delivering the intermediate media to the requested device in an interim period before the requested media is served to the requested device.

21. The method of claim 19, wherein processing the media request to identify the attributes of the media request includes parsing:

the media request received from the input device; and a trigger derived from the media request, the trigger intended for directing the media request to the requested device to prepare the requested device for presenting content responsive to the media request.

22. The method of claim 21, wherein parsing the media request to identify the attributes of the media request includes parsing metadata included in at least one of the media request or the trigger derived from the media request.

23. The method of claim 19, wherein accessing the intermediate media related to the identified attributes includes retrieving pre-existing images from an image repository, the pre-existing images corresponding to one or more of the identified attributes.

24. The method of claim 23, wherein the image repository includes captured images of one or more people, objects, or locations.

25. The method of claim 19, wherein accessing the intermediate media related to the identified attributes includes formulating a query based on the identified attributes of the media request to be presented to a generative media processing system to produce one or more generated images.

26. The method of claim 25, wherein formulating the query includes at least one of:

joining together one or more of the identified attributes into a terms-based query; or applying language processing to the one or more identified attributes to formulate a textual query.

27. The method of claim 25, further comprising providing one or more initial images of the one or more generated images during an interval, the interval including a time during which one or more additional images of the one or more generated images are being produced.

28. The method of claim 19, further comprising delivering the one or more images included in the intermediate media in a repeatable loop of the one or more images or in a random sequence of the one or more images.

29. A system comprising at least one computing device hosting:

an intermediate media service configured to analyze a media request received from an input device and directed to a media service, the media request being configured to initiate delivery of requested media at a requested device, the intermediate media service being configured to:

analyze the media request to identify attributes of the media request, the identified attributes being indicative of the subject matter of the requested media;

based on the identified attributes of the media request, access intermediate media including one or more images related to the identified attributes;

identify corresponding elements in two or more of the images and to animate a transition between the corresponding elements; and deliver the intermediate media to the requested device.

30. The system of claim 29, wherein the intermediate media service is configured to identify the attributes of the media request by parsing:

the media request received from the input device; and a trigger derived from the media request, the trigger intended for directing the media request to the requested device to prepare for presenting content responsive to the media request.

31. The system of claim 29, wherein the intermediate media service is configured to access the intermediate media related to the identified attributes by retrieving pre-existing images from an image repository, the pre-existing images corresponding to one or more of the identified attributes.

32. The system of claim 31, wherein the image repository includes captured images of one or more people, objects, or locations.

33. The system of claim 29, wherein the intermediate media service is configured to formulate a query based on the identified attributes of the media request to be presented to a generative media processing system to produce one or more generated images.

34. The system of claim 33, wherein the intermediate media service is configured to formulate the query based on the identified attributes by at least one of:

joining together one or more of the identified attributes into a terms-based query; or applying language processing to the one or more identified attributes to formulate a textual query.

35. The system of claim 33, wherein the intermediate media service is configured to provide one or more initial images of the one or more generated images during an interval, the interval including a time during which one or more additional images of the one or more generated images are being produced.

36. The system of claim 29, further comprising delivering the one or more images included in the intermediate media in a repeatable loop of the one or more images or in a random sequence of the one or more images.

* * * * *